United States Patent [19]

Huber et al.

[11] Patent Number: 5,559,622
[45] Date of Patent: Sep. 24, 1996

[54] CIRCUIT ARRANGEMENT FOR SWITCHING IN AN ALTERNATE CIRCUIT BETWEEN TWO FIBERS OF A DOUBLE LIGHT WAVEGUIDE CONNECTION BETWEEN TWO NODES

[75] Inventors: Manfred Huber, Graefelfing; Oliver Jahreis, Muenchen, both of Germany

[73] Assignee: Siemens Aktiengesellschaft, Munich, Germany

[21] Appl. No.: 491,595

[22] Filed: Jun. 16, 1995

[30] Foreign Application Priority Data

Jun. 17, 1994 [DE] Germany ............... 44 21 305.0

[51] Int. Cl.$^6$ .................................... H04B 10/08
[52] U.S. Cl. .................. 359/110; 359/117; 359/128; 370/16
[58] Field of Search ........................ 359/110, 117, 359/126, 128, 139, 173, 132, 133, 127; 370/16

[56] References Cited

U.S. PATENT DOCUMENTS

| | | | |
|---|---|---|---|
| 5,069,521 | 12/1991 | Hardwick | 359/110 |
| 5,091,796 | 2/1992 | Nishimura et al. | 359/110 |
| 5,432,627 | 7/1995 | Nishio | 359/117 |
| 5,434,691 | 7/1995 | Yamane | 359/110 |

FOREIGN PATENT DOCUMENTS

| | | |
|---|---|---|
| 2751645 | 5/1979 | Germany. |
| 3340428 | 5/1985 | Germany. |

OTHER PUBLICATIONS

ITU Telecommunication Standardization Sector, Paper Study Group 13, Question 23/13, Contribution 15, 1993, pp. 1–8.

Primary Examiner—Leo Boudreau
Assistant Examiner—Kinfe M. Negash
Attorney, Agent, or Firm—Hill, Steadman & Simpson

[57] ABSTRACT

For alternate circuiting between the two fibers of a double light waveguide connection proceeding between two nodes, the optical signal is split at the transmission side onto the two fibers. The two fibers are combined at the node of the reception side by an optical switch over device via which the working fiber is connected to the node of the receive side during a normal operating mode and which, in an alternate circuit mode, the redundant fiber is automatically connected to the node of the receive side instead of the working fiber. Two optical switches are inserted at the transmission side between the splitter and the two fibers, both of these optical switches being closed in normal operating mode. Only the optical switch inserted between the redundant fiber and the splitter remains closed in the alternate circuit mode, by contrast whereto the optical switch inserted between the splitter and the working fiber is opened.

6 Claims, 1 Drawing Sheet

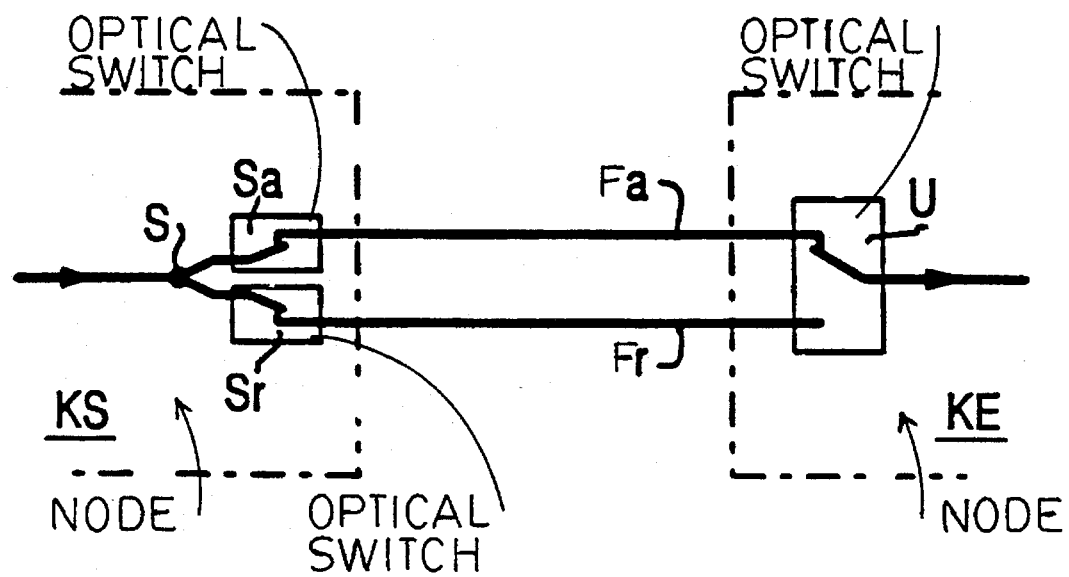

CIRCUIT ARRANGEMENT FOR SWITCHING IN AN ALTERNATE CIRCUIT BETWEEN TWO FIBERS OF A DOUBLE LIGHT WAVEGUIDE CONNECTION BETWEEN TWO NODES

BACKGROUND OF THE INVENTION

In order to provide a more trouble free light waveguide connection proceeding between two points in a telecommunication system, a double light waveguide connection, i.e. a light waveguide connection having two separate fibers is provided. Given an interruption in the signal transmission over one fiber, a switch is undertaken to the other fiber that is then used for further signal transmission in place of the previously used fiber. The required switchover time during which the signal transmission is interrupted should thereby be optimally short.

One prior art solution for such a switchover (alternate circuit) between the two fibers of a double light waveguide connection proceeding between two nodes (also see ITU-T Study Group 13, Question 23/13, Contribution 15, 1993) is as follows. The optical signal is split onto two fibers (working fiber and redundant fiber) at the node of the transmission side, these two fibers being combined at the node of the receive side by an optical switch means via which the working fiber is connected to the node of the receive side during normal operation. Given a break in the working fiber, the switch means switches automatically due to the outage of the transmitted light, so that the redundant fiber is now connected to the node of the receive side instead of the working fiber. As a result of performing the switchover at the receive side, the interrupt time can be kept short. In such a solution, however, the working fiber continues to carry the optical signal up to the break point, this potentially endangering the maintenance or, respectively, repair personnel or a random observer as well due to the great bundling of the laser light carried therein.

SUMMARY OF THE INVENTION

It is an object of the present invention to avoid the above-identified problem in the prior art and, thus, to enhance what is referred to as the laser safety.

In general terms the present invention is directed to a circuit arrangement for switching (alternate circuit) between the two fibers of a double light waveguide connection proceeding between two nodes. The optical signal is split onto the two fibers at the node of the transmission side. The two fibers are combined at the node of the receive side by an optical switch means via which the one fiber is connected to the node of the receive side as a working fiber during normal operation. In the alternate circuit mode, the circuit arrangement automatically connects the other redundant fiber to the node of the receive side. This circuit arrangement is inventively characterized in that two optical switches are inserted at the transmission side between the splitter and the two fibers, both of these switches being closed during normal operation. Of the two switches (in the alternate circuit case of a switching from the working fiber onto the redundant fiber at the receive side) only that optical switch inserted between this fiber and the splitter remains closed. By contrast whereto the optical switch inserted between the splitter and the working fiber is opened.

In a further development of the present invention, the switching of the receive side from one fiber onto the other fiber in case of alternate circuiting is reported for this purpose to the node of the transmission side, which opens the optical switch inserted between the splitter and the working fiber in response thereto.

BRIEF DESCRIPTION OF THE DRAWING

The features of the present invention, which are believed to be novel, are set forth with particularity in the appended claims. The invention, together with further objects and advantages may best be understood by reference to the following description taken in conjunction with the accompanying drawing, and in which:

The single FIGURE depicts a light waveguide connection according to the present invention.

DETAILED DESCRIPTION OF THE PRESENTLY PREFERRED EMBODIMENTS

In a scope necessary for an understanding of the present invention, the single FIGURE shows a double light waveguide connection, i.e. a light waveguide connection having a working fiber Fa and a redundant fiber Fr that proceeds between points KS,KE in a telecommunication system that are also referred to here as nodes. At the node KE of the receive side, the two fibers Fa,Fr are combined by an optical switch mechanism U via which the working fiber Fa is connected to the node KE of the receive side during normal operation. Given a break in the working fiber Fa, which (without this having to be set forth in greater detail here) can be identified at the switch mechanism U on the basis of the outage of the light transmitted over the working fiber Fa, the switch mechanism U automatically switches, so that the redundant fiber Fr is now connected to the node KE of the receive side instead of the working fiber Fa.

At the node KS of the transmission side, the optical signal to be transmitted is split onto the working fiber Fa and the redundant fiber Fr with a splitter S. Two optical switches Sa,Sr, both of which are closed in normal operation, are now inserted between the splitter S and the two fibers Fa,Fr. In case of an alternate circuiting, i.e. given a switching at the receive side from the working fiber Fa onto the redundant fiber Fr, let the node KS of the transmission side receive a message during the course of a corresponding protocol. In response thereto that optical switch Sr of the two switches Sa,Sr, which is inserted between the redundant fiber Fr and the splitter S, continues to remain closed. By contrast thereto that optical switch Sa, which is inserted between the splitter S and the working fiber Fa, is opened.

Thus, by way of the switching at the receive side, the interrupt time associated with the alternate circuiting continues to be kept short, on the one hand, and, on the other hand, it is assured shortly after the interruption that the broken fiber no longer carries an optical signal. The required laser safety is thus guaranteed.

The present invention is not limited to the particular details of the apparatus depicted and other modifications and applications are contemplated. Certain other changes may be made to the above described apparatus without departing from the true spirit and scope of the invention herein involved. It is intended, therefore, that the subject matter in the above depiction shall be interpreted as illustrative and not in a limiting sense.

What is claimed is:

1. A circuit arrangement for alternate circuit switching between two optical fibers of a double light waveguide connection between two nodes, comprising:

working and redundant optical fibers operationally connected between a transmission side of a first node and a receive side of a second node;

an optical splitter for splitting an optical signal onto the working and redundant optical fibers at the node of the transmission side;

an optical switch over device connected to said working and redundant optical fibers at the node of the receive side, the working optical fiber connected via the optical switch over device to the node of the receive side during a normal operation mode and the redundant optical fiber being disconnected via the optical switch over device from the node of the receive side during the normal operating mode, and, in an alternate circuit mode, the redundant optical fiber being automatically connected to the node of the receive side and the working optical fiber being automatically disconnected from the node of the receive side;

first and second optical switches at the transmission side, said first and second optical switches located between the splitter and the working and redundant optical fibers, respectively, both of said first and second optical switches being closed in the normal operating mode, and, in the alternate circuit mode, the second optical switch that is located between the redundant optical fiber and the splitter being closed, and the first optical switch that is located between said working optical fiber and the splitter being opened.

2. The circuit arrangement according to claim 1, wherein, in the alternate circuit mode, a switch over at the receive-side from the working fiber to the redundant fiber is reported to the node of the transmission side, which, in response thereto, opens the first optical switch that is located between the splitter and said working optical fiber.

3. A method for alternate circuit switching between two optical fibers of a double light waveguide connection between two nodes, comprising the steps of:

providing working and redundant optical fibers operationally connected between a transmission side of a first node and a receive side of a second node;

providing an optical splitter for splitting an optical signal onto the working and redundant optical fibers at the node of the transmission side;

providing an optical switch over device connected to said working and redundant optical fibers at the node of the receive side;

providing first and second optical switches at the transmission side, said first and second optical switches located between the splitter and the working and redundant optical fibers, respectively;

connecting the working optical fiber via the optical switch over device to the node of the receive side during a normal operation mode and disconnecting the redundant optical fiber via the optical switch over device from the node of the receive side during the normal operating mode;

automatically connecting, in an alternate circuit mode, the redundant optical fiber via the optical switch over device to the node of the receive side and automatically disconnecting the working optical fiber via the optical switch over device from the node of the receive side;

closing both of said first and second optical switches in the normal operating mode, and, in the alternate circuit mode of receive-side switching from the working optical fiber to the redundant optical fiber, keeping closed only the second optical switch that is located between the redundant optical fiber and the splitter, and opening the first optical switch that is located between said working optical fiber and the splitter.

4. The method according to claim 3, wherein, in the alternate circuit mode, a switch over at the receive-side from the working fiber to the redundant fiber is reported to the node of the transmission side, which, in response thereto, opens the first optical switch that is located between the splitter and said working optical fiber.

5. A circuit arrangement for alternate circuit switching between two fibers of a double light waveguide connection proceeding between two nodes, comprising:

first and second fibers operationally connected between a transmission side of a first node and a receive side of a second node;

an optical splitter for splitting an optical signal onto the two fibers at the first node of the transmission side;

an optical switch over device connected to said two fibers at the second node of the receive side, only one fiber of said two fibers connected via the optical switch over device to the second node of the receive side as a working fiber during a normal operation mode and only the other fiber of said two fibers connected via the optical switch over device to the second node of the receive side as a redundant fiber during an alternate circuit mode;

two optical switches at the transmission side located between the splitter and the two fibers, respectively, both of said optical switches being closed in the normal operating mode and, in the alternate circuit mode of receive-side switching of the optical signal from the working fiber onto the redundant fiber, only the optical switch located between the redundant fiber and the splitter remaining closed, the optical switch located between the working fiber and the splitter being opened.

6. The circuit arrangement according to claim 5, wherein, in the alternate circuit mode, the receive-side switching from the one fiber onto the other fiber is reported to the first node of the transmission side, which, in response thereto, opens the optical switch located between the splitter and said one fiber.

\* \* \* \* \*